W. H. THOMAS & T. H. CARTER.
Rain-Water Filter.
No. 203,092.        Patented April 30, 1878.
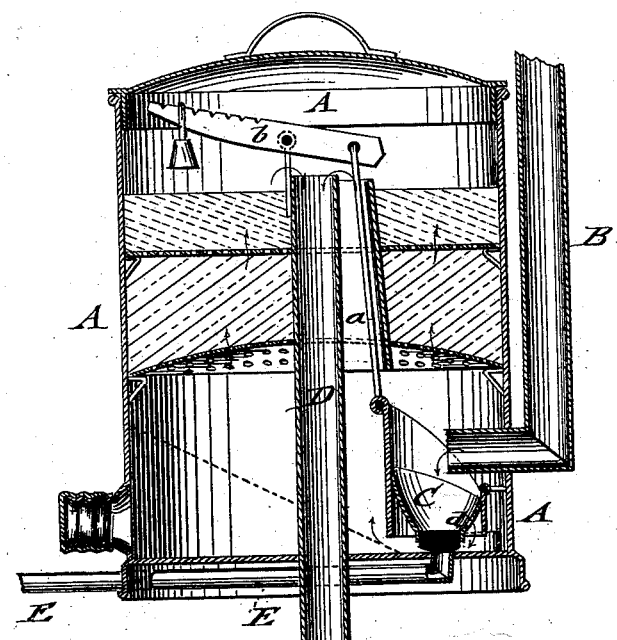
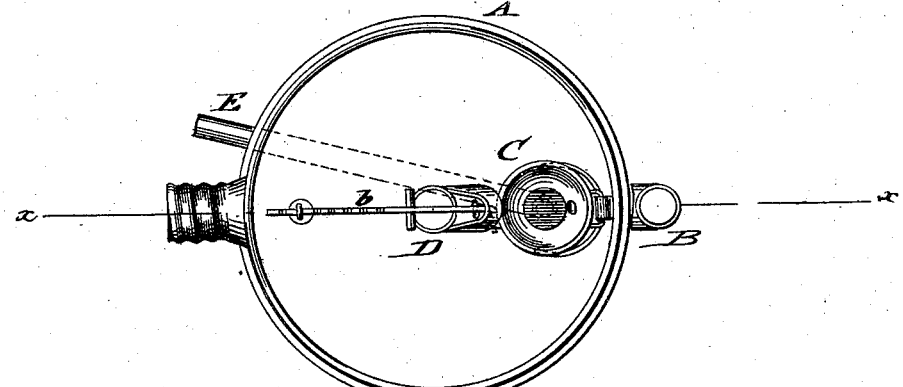

UNITED STATES PATENT OFFICE.

WILLIAM H. THOMAS AND THOMAS H. CARTER, OF MOUNT STERLING, KENTUCKY.

IMPROVEMENT IN RAIN-WATER FILTERS.

Specification forming part of Letters Patent No. 203,092, dated April 30, 1878; application filed March 25, 1878.

*To all whom it may concern:*

Be it known that we, WILLIAM H. THOMAS and THOMAS H. CARTER, of Mount Sterling, in the county of Montgomery and State of Kentucky, have invented a new and Improved Rain-Water Filter, of which the following is a specification:

In the accompanying drawing, Figure 1 represents a vertical central section, on line $x\ x$, Fig. 2, of our improved rain-water filter for cisterns; and Fig. 2 is a top view of the same with lid removed.

Similar letters of reference indicate corresponding parts.

The object of this invention is to furnish an improved filter for the purpose of filtering the rain-water that passes from the roof to the cistern. The filter is so constructed that the objectionable freezing up of the same in winter is avoided by the automatic draining off of the water in the filter as soon as the supply from the roof ceases, but closed again, so as to cause the water to pass through the filtering material, as soon as water is supplied from the roof.

The invention consists of a cup, with bottom valve, hinged to the interior of the filter, in connection with a bottom drain-pipe and a water conducting-tube.

The hinged cup is balanced by a fulcrumed and weighted lever. The filtering material is arranged, between perforated strainers at the upper part of the filter, around the central exit-tube, that leads the water to the cistern. The weight of water in the cup closes the drain-pipe, and compels the water to pass through the filtering material until, the supply ceasing, the valved cup is automatically lifted from the drain-pipe, and thereby any remaining water drained off through a small perforation of the cup and the bottom drain-pipe.

Referring to the drawing, A represents the exterior vessel or receptacle of our improved rain-water filter. The vessel A is connected by a water-conducting pipe, B, to the gutters of the roof, the supply-pipe B extending to the inside of the vessel, at the lower part of the same, and discharging the water into a cup, C, that is hinged to the side of the wall at the interior of the vessel.

The cup is connected by a pivot-rod, $a$, to a fulcrumed lever, $b$, at the upper part of the central exit-tube D, the fulcrumed lever being weighted in adjustable manner so as to balance the cup, and cause the lifting of the cup when there is no water in the same.

The cup C is provided with an elastic bottom valve, C', of rubber or other material, that bears by its convex lower surface on the discharge-opening of a drain-pipe, E, which extends from the bottom of the filter to the outside of the same, and thence to the ground. The cup C is further provided with a small exit-perforation, $d$, sidewise of the valve, so that the water in the cup may be drained off into the lower part of the vessel A.

The filtering material is arranged between perforated strainers at the interior of the vessel A, the diaphragms being supported in suitable manner on seats of the vessel.

The rod connecting the cup and weighted lever is inclosed by a small tube, so as to prevent the packing of the filtering material around the same, keeping up thereby the uninterrupted and automatical working of the cup.

As soon as water is supplied from the roof through the conducting-tube to the cup, the latter is lowered by the weight of the water, so that the bottom valve closes the exit-pipe, and that the water is thereby compelled to rise through the charcoal, gravel, or other filtering material and the strainers, and to flow through the central pipe to the cistern.

As soon as the water ceases flowing out of the conducting-pipe, the cup is gradually drained of its contents by the small side perforation, and then automatically lifted by its balance-weight from the bottom drain-pipe, so as to drain all the water out of the filter. The draining of the water in the lower part of the filter is thus entirely automatic, and requires no special attention.

The vessel may be provided with an opening at the lower part, closed by a screw-cap, for cleaning the same of sediment, and for preserving the tight seating of the valved cup on the exit opening of the drain-pipe.

The draining of the water from the filter by the automatical working cup-valve prevents the freezing of the filter and produces the cleaning out of any dirt or other sediment, so as to furnish a more reliable and better filter for rain-water than those heretofore in use.

Having thus described our invention, we claim as new and desire to secure by Letters Patent—

1. The combination, with a vessel or receptacle having interior filtering material and water supply and discharge pipes, of an interior hinged and balanced cup, having bottom valve, and of a bottom drain-pipe, substantially as shown and described.

2. The combination of a filtering-vessel, having water-supply pipe, central discharge and bottom drain pipe, with an interior cup, hinged below the supply-pipe, and having a bottom valve and drain perforation, substantially as and for the purpose set forth.

WILLIAM HARVEY THOMAS.
THOMAS HENRY CARTER.

Witnesses:
BEN. J. ROBERTSON,
W. N. COCKRELL.